(12) United States Patent
Nose

(10) Patent No.: US 10,304,368 B2
(45) Date of Patent: May 28, 2019

(54) PROJECTOR, IMAGE PROJECTION METHOD, AND RECORDING MEDIUM STORING PROGRAM USING TIME-CONTROLLED PIXEL SHIFTING

(71) Applicant: Masaki Nose, Kanagawa (JP)

(72) Inventor: Masaki Nose, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/597,658

(22) Filed: May 17, 2017

(65) Prior Publication Data

US 2017/0357148 A1  Dec. 14, 2017

(30) Foreign Application Priority Data

Jun. 9, 2016  (JP) .................. 2016-115385

(51) Int. Cl.
*H04N 9/31* (2006.01)
*G09G 3/00* (2006.01)
(Continued)

(52) U.S. Cl.
CPC .......... *G09G 3/007* (2013.01); *G03B 21/005* (2013.01); *G03B 21/142* (2013.01);
(Continued)

(58) Field of Classification Search
CPC ...... G03B 33/12; G03B 21/142; G03B 21/14; H04N 9/3188; H04N 9/3111;
(Continued)

(56) References Cited

U.S. PATENT DOCUMENTS 5,784,038 A * 7/1998 Irwin .................. H04N 9/3114
345/32
6,520,648 B2 * 2/2003 Stark .................. H04N 9/3114
348/743
(Continued)

FOREIGN PATENT DOCUMENTS

JP 2003-295156 10/2003
JP 2008-508844 3/2008
(Continued)

*Primary Examiner* — Bao-Luan Q Le
(74) *Attorney, Agent, or Firm* — Oblon, McClelland, Maier & Neustadt, L.L.P.

(57) ABSTRACT

A projector, an image projection method, and a recording medium storing a program. The projector includes a color wheel configured to divide light by time into light rays of a plurality of colors including at least a first color and a second color, the light forming an image to be projected, an image generator configured to generate the image including a plurality of pixels from the light rays divided by time by the color wheel, a shifting member configured to shift the plurality of pixels of the image formed by the first color and the second color, with varying shifting speeds, a color-wheel controller configured to control the color wheel, a shifting controller configured to control the shifting member, and a timing controller configured to generate a first timing signal for controlling timings of the color wheel and a second timing signal for controlling timings of the shifting member.

13 Claims, 11 Drawing Sheets

(51) Int. Cl.
*G03B 21/00* (2006.01)
*G03B 21/14* (2006.01)
*H04N 5/74* (2006.01)

(52) U.S. Cl.
CPC ........... *H04N 5/7416* (2013.01); *H04N 9/312* (2013.01); *H04N 9/315* (2013.01); *H04N 9/3111* (2013.01); *H04N 9/3114* (2013.01); *H04N 9/3117* (2013.01)

(58) Field of Classification Search
CPC .... H04N 9/3117; H04N 9/3114; H04N 9/315; G09G 2310/0235; G09G 3/007
See application file for complete search history.

(56) References Cited

U.S. PATENT DOCUMENTS

| | | | | |
|---|---|---|---|---|
| 6,984,040 B2* | 1/2006 | Childers | ................ | G09G 3/007 348/743 |
| 7,052,142 B2* | 5/2006 | Gupta | ................ | G03B 21/20 348/E5.137 |
| 7,086,736 B2* | 8/2006 | Collins | ................ | G09G 3/007 348/743 |
| 7,182,463 B2* | 2/2007 | Conner | ................ | H04N 9/3188 348/E9.027 |
| 7,267,442 B2* | 9/2007 | Childers | ................ | H04N 9/3111 348/792 |
| 7,270,417 B2* | 9/2007 | Choi | ................ | G02B 26/0875 348/745 |
| 7,290,884 B2* | 11/2007 | Choi | ................ | G02B 26/0875 348/745 |
| 7,300,157 B2* | 11/2007 | Conner | ................ | H04N 9/3188 348/E9.027 |
| 7,425,074 B2* | 9/2008 | Kang | ................ | H04N 9/3188 353/121 |
| 7,477,799 B2* | 1/2009 | Chang | ................ | H04N 5/7458 348/E5.142 |
| 7,600,874 B2* | 10/2009 | Childers | ................ | H04N 9/3117 348/742 |
| 7,762,669 B2* | 7/2010 | Choi | ................ | H04N 9/3179 348/771 |
| 7,810,932 B2* | 10/2010 | Hong | ................ | H04N 9/3141 353/121 |
| 8,016,429 B2* | 9/2011 | Chang | ................ | H04N 9/315 348/771 |
| 8,322,865 B2* | 12/2012 | Lin | ................ | G03B 21/28 349/106 |
| 9,442,357 B2* | 9/2016 | Ferri | ................ | G03B 21/204 |
| 2002/0140910 A1* | 10/2002 | Stark | ................ | H04N 9/3114 353/84 |
| 2005/0128438 A1* | 6/2005 | Kang | ................ | H04N 9/3141 353/69 |
| 2005/0128443 A1* | 6/2005 | Kang | ................ | H04N 9/3141 353/122 |
| 2005/0134805 A1* | 6/2005 | Conner | ................ | H04N 9/3188 353/46 |
| 2005/0157272 A1* | 7/2005 | Childers | ................ | G09G 3/007 353/84 |
| 2005/0162617 A1* | 7/2005 | Koo | ................ | H04N 9/3141 353/46 |
| 2005/0243290 A1* | 11/2005 | Gupta | ................ | G03B 21/20 353/99 |
| 2005/0264501 A1* | 12/2005 | Choi | ................ | G02B 27/0933 345/84 |
| 2005/0275810 A1* | 12/2005 | Choi | ................ | G02B 26/0875 353/69 |
| 2006/0007057 A1* | 1/2006 | Choi | ................ | G02B 26/0875 345/9 |
| 2006/0082562 A1* | 4/2006 | Childers | ................ | H04N 9/3111 345/204 |
| 2006/0140511 A1* | 6/2006 | Chang | ................ | H04N 5/7458 382/298 |
| 2006/0290824 A1* | 12/2006 | Hong | ................ | H04N 5/74 348/739 |
| 2007/0268459 A1* | 11/2007 | Childers | ................ | H04N 9/3111 353/31 |
| 2007/0273955 A1* | 11/2007 | Chang | ................ | G02B 26/10 359/292 |
| 2008/0024518 A1* | 1/2008 | Hoffman | ................ | G09G 3/007 345/611 |
| 2011/0228173 A1* | 9/2011 | Lin | ................ | G03B 21/28 348/743 |
| 2012/0201030 A1* | 8/2012 | Yuan | ................ | G02B 26/008 362/293 |
| 2013/0100420 A1* | 4/2013 | Ferri | ................ | G03B 21/204 353/31 |
| 2017/0097560 A1* | 4/2017 | Matsubara | ........... | G03B 21/204 |

FOREIGN PATENT DOCUMENTS

JP 2008-16624 5/2008
WO WO2006/022820 A2 3/2006

* cited by examiner

ORIGINAL PIXELS    SHIFTED PIXELS    RESOLUTION AFTER PIXEL-SHIFTING

PROJECTOR, IMAGE PROJECTION METHOD, AND RECORDING MEDIUM STORING PROGRAM USING TIME-CONTROLLED PIXEL SHIFTING

CROSS-REFERENCE TO RELATED APPLICATION

This patent application is based on and claims priority pursuant to 35 U.S.C. § 119(a) to Japanese Patent Application No. 2016-115385, filed on Jun. 9, 2016, in the Japan Patent Office, the entire disclosure of which is hereby incorporated by reference herein.

BACKGROUND

Technical Field

Embodiments of the present disclosure relate to a projector, an image projection method, and a recording medium storing a program.

Background Art

Some technology to achieve higher resolution of an image that is projected by a device such as a projector is known in the art. As such technology to achieve higher resolution, pixel shifting is known that improves the resolution by shifting the pixels of an image and complementing the space among the pixels with pixels.

SUMMARY

Embodiments of the present disclosure described herein provide a projector, an image projection method, and a recording medium storing a program. The projector includes a color wheel configured to divide light by time into light rays of a plurality of colors including at least a first color and a second color, the light forming an image to be projected, an image generator configured to generate the image including a plurality of pixels from the light rays divided by time by the color wheel, a shifting member configured to shift the plurality of pixels of the image formed by the first color and the second color, with varying shifting speeds, a color-wheel controller configured to control the color wheel, a shifting controller configured to control the shifting member, and a timing controller configured to generate a first timing signal for controlling timings of the color wheel and a second timing signal for controlling timings of the shifting member, to assign the first color and the second color with higher human visibility than the first color to a first time period and a second time period where shifting speed of the pixels is slower than the first time period, respectively. The image projection method includes generating a first timing signal and a second timing signal, to assign a first color to a first time period, and generating the first timing signal and the second timing signal, to assign a second color with higher human visibility than the first color to a second time period where shifting speed of pixels of an image to be projected is slower than the first time period.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
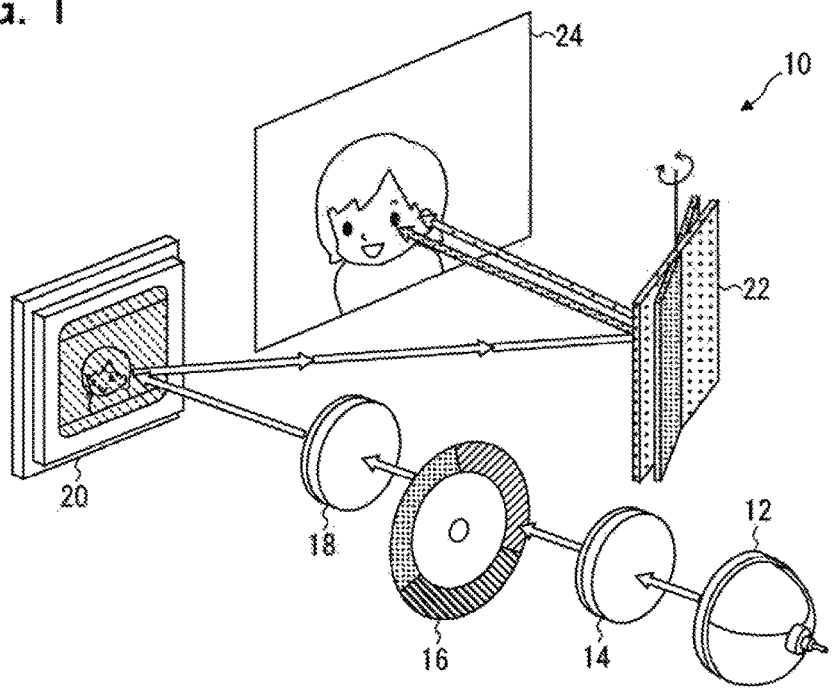
FIG. 1 is a schematic diagram illustrating an optical system of a projector, according to an embodiment of the present disclosure.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the contest clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note that the example embodiments or modifications given below involve like elements. For this reason, like reference signs denote like elements in the following description, and some of the overlapping descriptions is omitted. Some of the elements in one of the embodiments or modifications given below may be replaced with corresponding elements in the other embodiments or modification. Note also that, for example, the configuration or the position of the elements in one of the embodiments or modifications given below corresponds to those in the other embodiments or modification unless otherwise specified.

First Embodiment

FIG. 1 is a schematic diagram illustrating an optical system of a projector 10 according to a first embodiment of the present disclosure (see http://xymox1.com/sears/smoothpicture1.pdf).

The projector 10 is, for example, a lightweight and compact digital light processing (DLP) projector where the age deterioration is relatively small. As illustrated in FIG. 1, the projector 10 includes a light source 12, a lens 14, a color wheel 16, a lens 18, a light modulator 20 that is an example of an image generator, and a shifting member 22.

The light source 12 includes, for example, a halogen lamp, metal halide lamp, or a high-pressure mercury-vapor lamp. The light source 12 outputs light to form an image to be projected. The light source 12 outputs white light to the color wheel 16 through, for example, the lens 14.

The color wheel 16 is arranged in the directions of travel of the light output from the light source 12. The color wheel 16 is, for example, shaped like a disk. The color wheel 16 is coupled to the rotation axis of a motor in the center. The color wheel 16 has a plurality of color areas that are arranged in the circumferential direction, and each of the color areas transmits (filters) one of a plurality of colors included in the light output from the light source 12. Due to the configuration as described above, the color wheel 16 is rotated by the motor, and divides the light output from the light source 12, which forms an image, into light rays of two or more colors by time. The color wheel 16 outputs the light that has been divided into light rays of two or more colors by time to the light modulator 20 through the lens 18.

The light modulator 20 is arranged in the directions of travel of the light that has passed through the color wheel 16. The light modulator 20 is, for example, a digital micromirror device (DMD). The light modulator 20 includes a plurality of micromirrors, and these micromirrors are disposed in two directions and arranged in a matrix. These multiple micromirrors are electrically controlled on an individual basis, and are switched between "ON" and "OFF" states. For example, the micromirrors in the "ON" state reflect towards the shifting member 22 the light that the color wheel 16 has divided into light rays of two or more colors by time. On the other hand, the micromirrors in the "OFF" state reflect the light that the color wheel 16 has divided into light rays of two or more colors by time towards a direction other than the direction of the shifting member 22 on which a light absorption member is disposed. As described above, the micromirrors in the "ON" state reflects the light towards the shifting member 22, and the micromirrors in the "OFF" state reflects the light towards a place other than the shifting member 22. By so doing, an image is formed.

The shifting member 22 may be referred to as an optical actuator. The shifting member 22 projects an image by reflecting the multiple pixels of an image that is formed by the light reflected from the micromirrors of the light modulator 20 in the "ON" state, i.e., light rays (or a bundle of light rays) of a plurality of colors, towards the screen 24. The shifting member 22 swings at regular time intervals, for example, around the rotation axis. Due to this configuration, the shifting member 22 implements pixel shifting by shifting the pixels of the image formed by a plurality of colors with varying shifting speeds. More specifically, the shifting member 22 shifts back and forth the pixels, which are formed by the light reflected from the light modulator 20, by about half the pixel in a direction intersecting the rotation axis. For example, the direction of such shifting may be orthogonal to the rotation axis. As a result, the resolution is artificially doubled. One cycle in which the shifting member 22 swings (i.e., a period of time that the shifting member 22 takes to shift the pixels back and forth one time is, for example, an integral multiple (for example, two times) of the rotation cycle of the color wheel 16. Alternatively, the shifting member 22 may shift the pixels in two directions. In this configuration, the shifting member 22 increases the resolution by fourfold.

An operation of the projector 10 is described below. In the projector 10, the light source 12 outputs light to form an image. Then, the color wheel 16 receives the light output from the light source 12 through the lens 14. The color wheel 16 divides the received light into light rays of a plurality of colors by time, and outputs these light rays to the light modulator 20. The light modulator 20 reflects some of the light rays of a plurality of colors, which is received through the lens 18, towards the shifting member 22. The shifting member 22 projects an image by reflecting the light received from the light modulator 20 towards the screen 24. Further, the shifting member 22 shifts the pixels formed by the light received from the light modulator 20 to enhance the resolution of the image.

Figure 2:
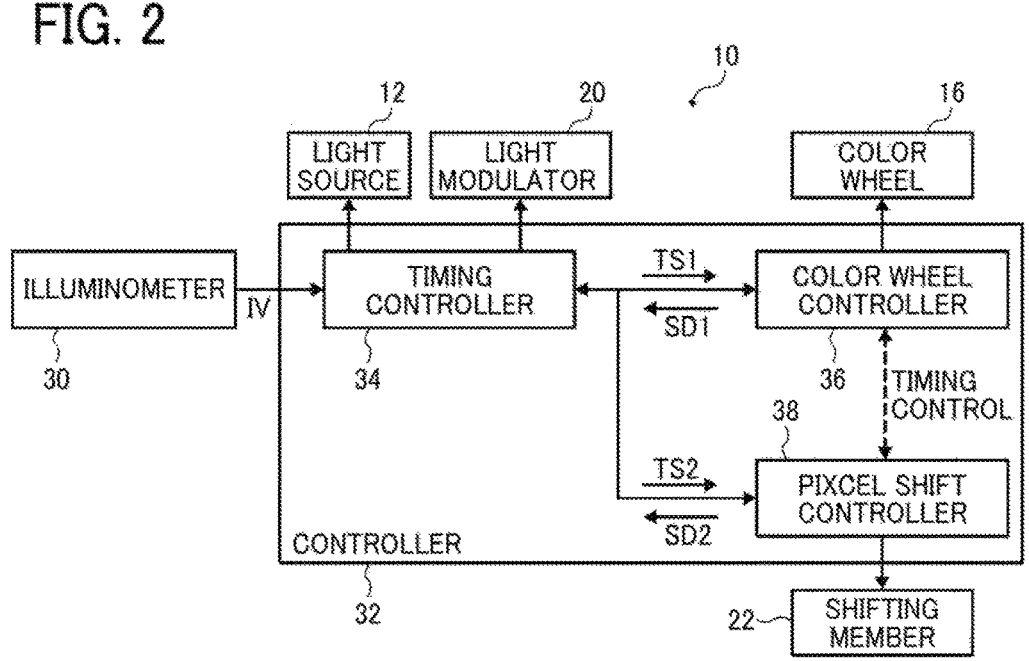
FIG. 2 is a block diagram illustrating a control system of a projector, according to an embodiment of the present disclosure.

FIG. 2 is a block diagram illustrating a control system of the projector 10, according to the present embodiment.

As illustrated in FIG. 2, the projector 10 further includes an illuminometer 30 that is an example of an illuminance measuring instrument, and a controller 32.

The illuminometer 30 measures an illuminance value IV indicating the illuminance around the projector 10. The illuminometer 30 sends the measured illuminance value IV to the timing controller 34. In the present embodiment, the illuminometer 30 may be omitted.

The controller 32 includes a timing controller 34, a color-wheel controller 36, and a pixel-shifting controller 38 that is an example of a shifting controller.

The color-wheel controller 36 controls the color wheel 16. For example, the color-wheel controller 36 controls the rotation speed of the color wheel 16 based on the first timing signal TS1 obtained from the timing controller 34. The color-wheel controller 36 sends first status information SD1 indicating the status of the color wheel 16 to the timing controller 34. The first status information SD1 is, for example, the position of the color wheel 16 in the rotating coordinate system around the rotation center of the color wheel 16.

The pixel-shifting controller 38 controls the shifting member 22. For example, the pixel-shifting controller 38 controls operation of the shifting member 22 based on the second timing signal TS2 obtained from the timing controller 34. The pixel-shifting controller 38 sends second status information SD2 indicating the status of pixel shifting by the shifting member 22 to the timing controller 34. The second status information SD2 is, for example, the rotation speed of the shifting member 22 around the rotation center of the shifting member 22.

The timing controller 34 controls timings of die color wheel 16 and the shifting member 22. More specifically, the timing controller 34 obtains the first status information SD1 from the color-wheel controller 36, and obtains the second status information SD2 from the pixel-shifting controller 38. The timing controller 34 sends the first timing signal TS1 for controlling the timings of the color wheel 16 to the color-wheel controller 36 based on the first status information SD1 and the second status information SD2. The timing controller 34 sends the second timing signal TS2 for controlling the timings of the pixel shifting of the shifting member 22 to the pixel-shifting controller 38 based on the first status information SD1 and the second status information SD2. Due to the configuration as described above, the timing controller 34 controls the timings of the time division of color areas of the color wheel 16 and the pixel shifting by the shifting member 22. More specifically, the timing controller 34 generate the first timing signal TS1 for controlling the timings of the color wheel 16 and the second timing signal TS2 for controlling the timings of the shifting member 22 such that the first one of the multiple colors will be assigned to the first time periods and the second one of the colors with higher visibility by human than that of the first one of the colors will be assigned to the second time periods where the shifting speed of pixels is slower than that of the first time periods.

Figure 3:
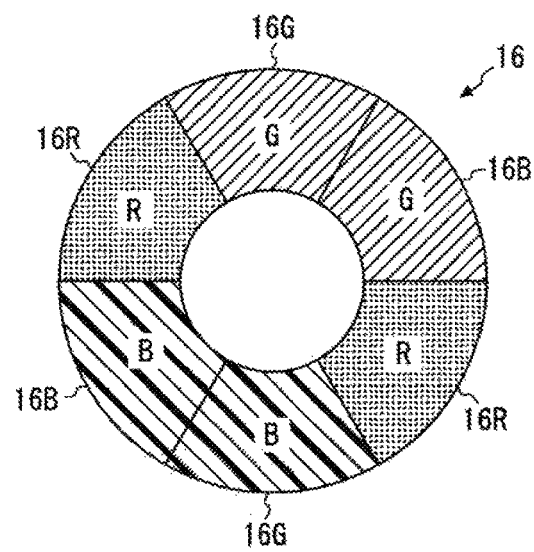
FIG. 3 is a front view of an RGB color wheel according to an embodiment of the present disclosure.

FIG. 3 is a front view of an RGB (red, green, blue) color wheel 16 according to the present embodiment.

As illustrated in FIG. 3, the color wheel 16 has a plurality of color areas that are divided into six in the circumferential direction. The color areas include two red areas 16R, two blue areas 16B, and two green areas 16G. The volumes of the red areas 16R, the blue areas 16B, and the green areas 16G may be different from each other. The red areas 16R transmit the red lights out of the lights emitted from the light source 12. The blue areas 16B transmit the blue lights out of the lights emitted from the light source 12. The green areas 16G transmit the green lights out of the lights emitted from the light source 12. Due to the configuration as described above, the color wheel 16 rotates at a constant speed, and transmits the red lights, blue lights, and the green lights to the light modulator 20 at regular time intervals.

Figure 4:
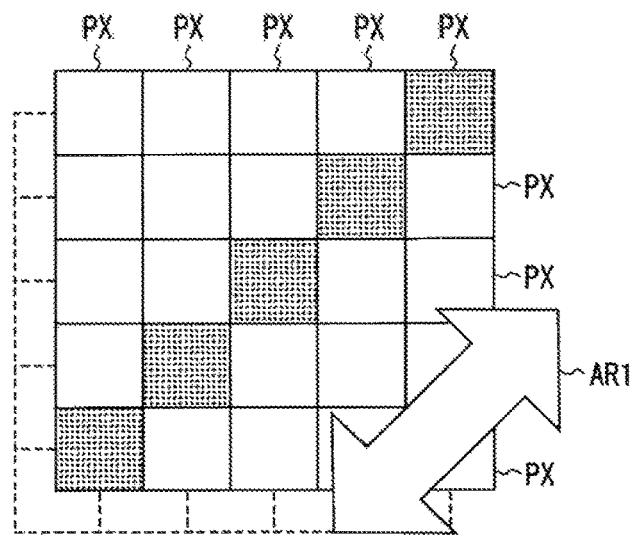
FIG. 4 is a diagram illustrating the arrangement of pixels in two-way pixel shifting, according to an embodiment of the present disclosure.

FIG. 4 is a diagram illustrating the arrangement of pixels in two-way pixel shifting, according to the present embodiment.

More specifically, the example illustrated in FIG. 4 indicates two-way pixel shifting where pixels PX are shifted back and forth in the direction of an arrow AR1. The shifting direction is, for example, in a slanting direction that intersects the directions in which the pixels PX are arranged. The two-way pixel shifting doubles the resolution. Accordingly, the two-way pixel shifting can improve the full high definition (FHD) to, for example, 4K.

Figure 5:
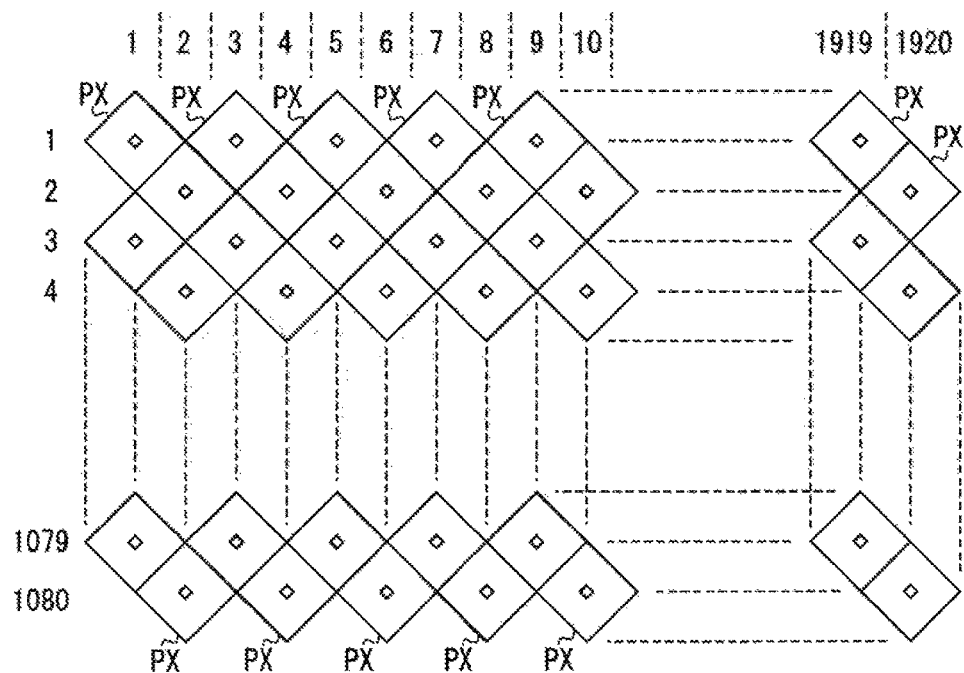
FIG. 5 is a diagram illustrating the arrangement of pixels PX for pixel shifting, according to an embodiment of the present disclosure.

FIG. 5 is a diagram illustrating the arrangement of pixels PX for pixel shifting, according to the present embodiment (see http://xymox1.com/sears/smoothpicture1.pdf).

As illustrated in FIG. 5, the pixels PX are square-shaped. The sides of the pixels PX are inclined by 45 degrees with reference to the horizontal direction and the vertical direction.

Figure 6:
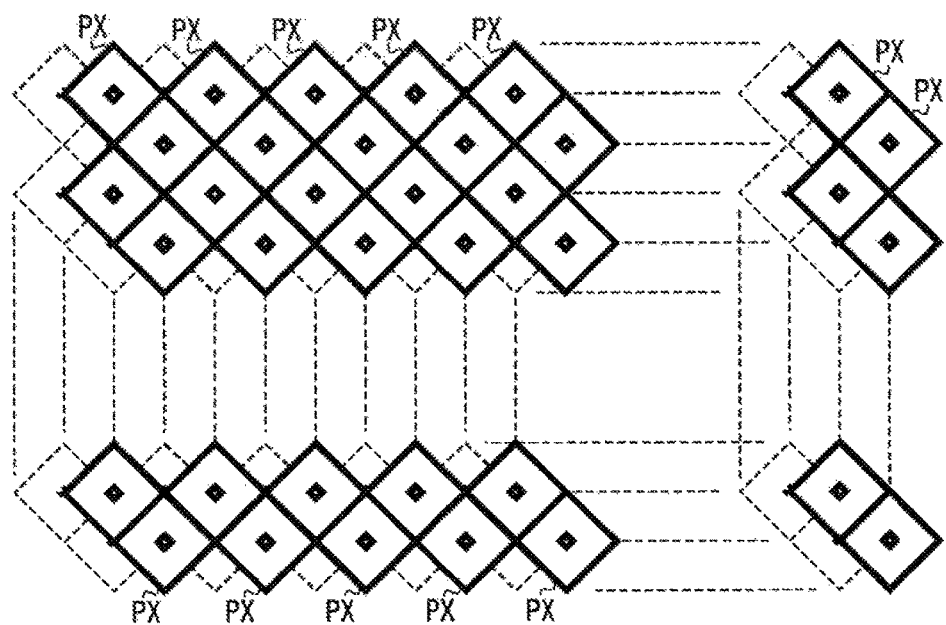
FIG. 6 is a diagram illustrating two-way pixel shifting in the arrangement of pixels PX illustrated in FIG. 5, according to an embodiment of the present disclosure.

FIG. 6 is a diagram illustrating two-way pixel shifting in the arrangement of pixels PX illustrated in FIG. 5, according to the present embodiment (see http://xymox1.com/sears/smoothpicture1.pdf).

In the pixel shifting illustrated in FIG. 6, the pixels PX are shifted by about half the pixel in the horizontal direction that intersects the directions in which the pixels PX are arranged by 45 degrees. Due to the configuration as described above, the pixels PX move from the original positions indicated by thin dotted lines to the positions indicated by thick solid lines. This indicates that the resolution is doubled.

Figure 7:
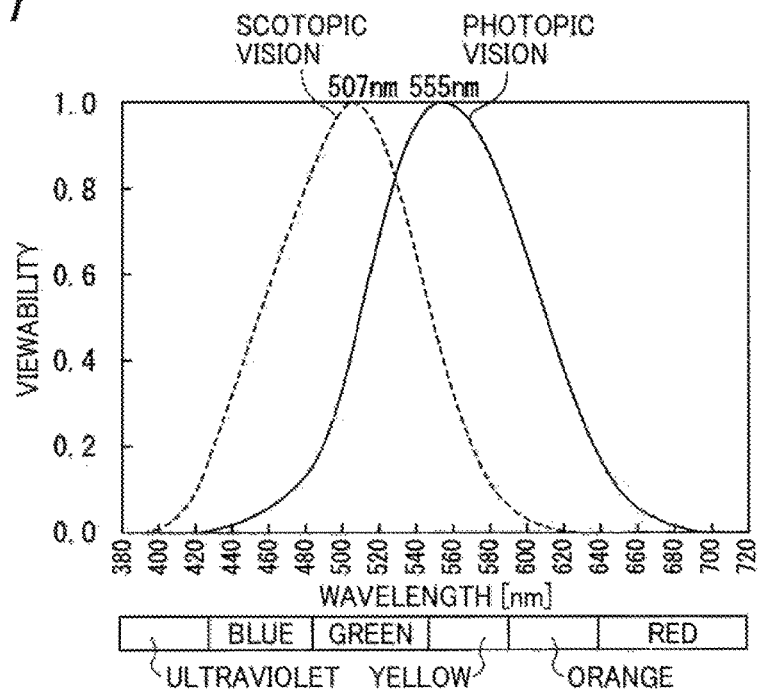
FIG. 7 is a graph illustrating the properties and characteristics of viewability of humans.

FIG. 7 is a graph illustrating the properties and characteristics of viewability of humans.

As illustrated in FIG. 7, under bright environments (see photopic vision), the viewability of human eyes has a peak around yellowish green of the wavelength of 555 nanometers (nm), and decreases for red and blue. Under dark environments (see scotopic vision), the peak of the viewability of human eyes shifts to a shorter wavelength compared with bright environments. Accordingly, under dark environments, the viewability of human eyes has a peak around blue of 507 nanometers (nm), and decreases for red and green. A phenomenon in which the peak of the viewability of human eyes shifts between bright environments and dark environments is referred to as a Purkinje phenomenon. Note also that the viewability of human eyes is high for green in both of the bright environments and the dark environments.

Figure 8:
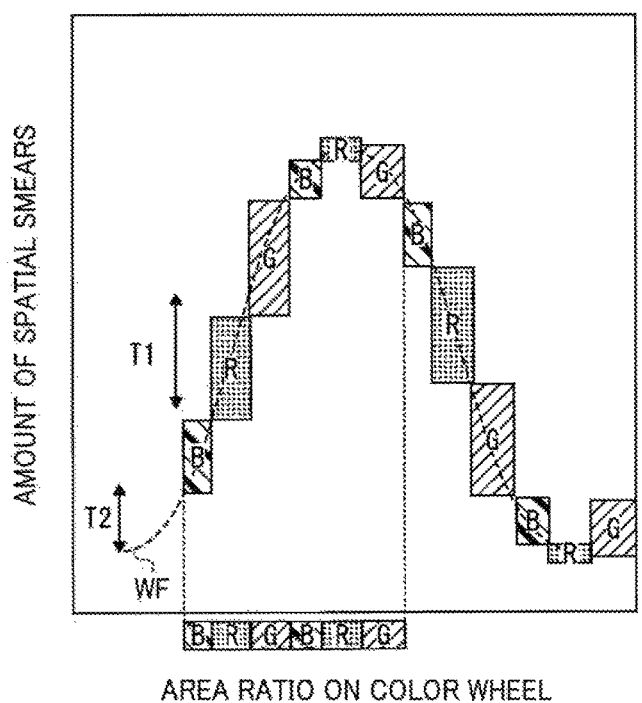
FIG. 8 is a diagram illustrating the relation between the area ratio of the colors of a color wheel and the amount of spatial smears, according to an embodiment of the present disclosure.

FIG. 8 is a diagram illustrating the relation between the area ratio of the colors of a color wheel and the amount of spatial smears, according to the present embodiment.

In FIG. 8, the vertical axis indicates the amount of spatial smears of the colors on the screen 24, and the horizontal axis indicates the area ratio of the colors of the color wheel 16.

As indicated by dotted lines, the waveform WF of the shifting speed of pixel shifting is typically in a sine wave. For example, in two-way pixel shifting, the pixels PX move back and forth on the screen 24. In such back-and-forth movements, the pixels PX have the slowest shifting speed (i.e., "0") at both ends of the range of movement, which correspond to gradual portions of the waveform WF at the upper and lower edges. By contrast, the pixels PX have the fastest shifting speed in the center of the range of movement, which correspond to steep portions in the middle of the waveform WF.

The rotation of the color wheel 16 needs to be synchronized with the waveform of the shifting speed of pixel shifting. However, the shifting speed of the pixels PX are not constant on the color wheel 16. Accordingly, there are colors with a large amount of spatial movement and colors with a small amount of spatial movement on the screen 24. Due to this configuration, as the vertical lengths of the rectangles of the colors are different from each other, the smears differ from color to color on the screen 24. In the example as illustrated in FIG. 8, the red areas 16R and the green areas 16G of the color wheel 16 are irradiated with the lights emitted from the light source 12 during time periods T1 where the shifting speed is fast in the sine wave. Accordingly, as illustrated in FIG. 8, the smears of the red R and the green G become large. On the other hand, the blue areas 16B of the color wheel 16 are irradiated with the lights emitted from the light source 12 during the second time periods T2 where the shifting speed is slower than the first time periods T1. Accordingly, the smears of the blue B become small. As described above, the viewability of green by human eyes is higher than the visibility of red and blue. Accordingly, in the example as illustrated in FIG. 8, human eyes strongly sense the smears of green. In particular, the viewability of blue by human eyes is weak compared with the viewability of green. Accordingly, in the example as illustrated in FIG. 8, human eyes sense the smears of blue significantly weak compared with the smears of green. As a result, the image becomes unclear, and the image quality deteriorates.

Figure 9:
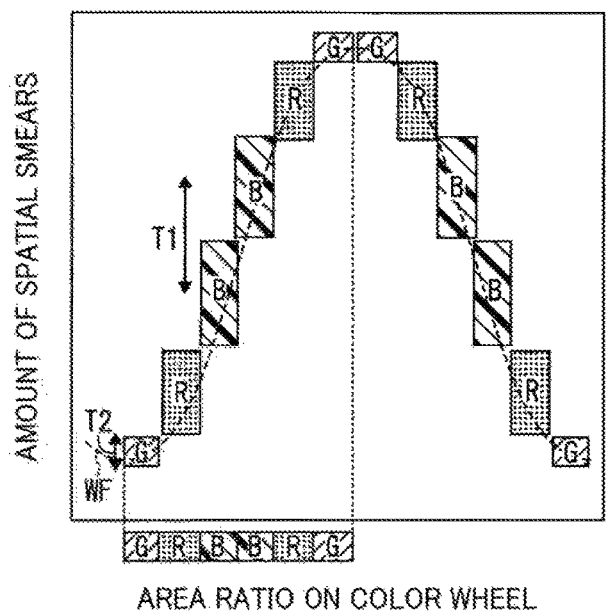
FIG. 9 is a diagram illustrating the relation between the area ratio of the colors of a color wheel and the amount of spatial smears, according to a first embodiment of the present disclosure.

FIG. 9 is a diagram illustrating the relation between the area ratio of the colors of the color wheel 16 and the amount of spatial smears, according to the first embodiment of the present disclosure.

In FIG. 9, the vertical axis indicates the amount of spatial smears of the colors on the screen 24, and the horizontal axis indicates the area ratio of the colors of the color wheel 16. As illustrated in FIG. 9, during the first time periods T1 where the shifting speed of the pixel shifting of the pixels PX is fast, the timing controller 34 controls the color wheel 16 such that color areas where the human-eye viewability is low (for example, the blue areas 16B where the viewability is the lowest) among the color areas 16R, 16G, and 16B of the color wheel 16a are irradiated with the lights emitted from the light source 12. The first time periods T1 are, for example, the time periods that include a time period where the shifting speed is the fastest. In other words, the timing controller 34 synchronizes the first time periods T1 where the shifting speed is fast with at least some of the time periods during which color areas with low viewability are irradiated with light.

The timing controller 34 controls the color wheel 16 such that color areas where the human-eye viewability is high (for example, the green areas 16G where the viewability is the highest) among the color areas 16R, 16G, and 16B of the color wheel 16 are irradiated with the lights emitted from the light source 12, during the second time periods T2 where the shifting speed of the pixel shifting of the pixels PX is slow. The second time periods T2 are, for example, the time periods other than the first time periods T1 and time periods that include a time period where the shifting speed is the slowest. In other words, the timing controller 34 synchronizes the second time periods T2 where the shifting speed is slow with at least some of the time periods during which color areas with high viewability are irradiated with light.

Due to this configuration, the timing controller 34 increases the amount of smears of a color with low viewability (for example, the blue B), and reduces the amount of smears of a color with high viewability (for example, the green G). Accordingly, the influence of the variations in the amount of smears of each color due to the varying shifting speeds of pixel shifting can be reduced, and the image quality improves. In the present embodiment, the blue B is an example of the primary color. In the present embodiment, the green G is an example of the secondary color. As illustrated in FIG. 9, the color with the lowest visibility such as blue may be concentrated in time periods where the shifting speed is fast. However, in order to shorten the cycle where the colors are switched and reduce the adverse effects of color breaking, two colors of the color with the lowest visibility and the color with the second lowest visibility may be arranged in the time periods where the shifting speed is fast.

Figure 10:
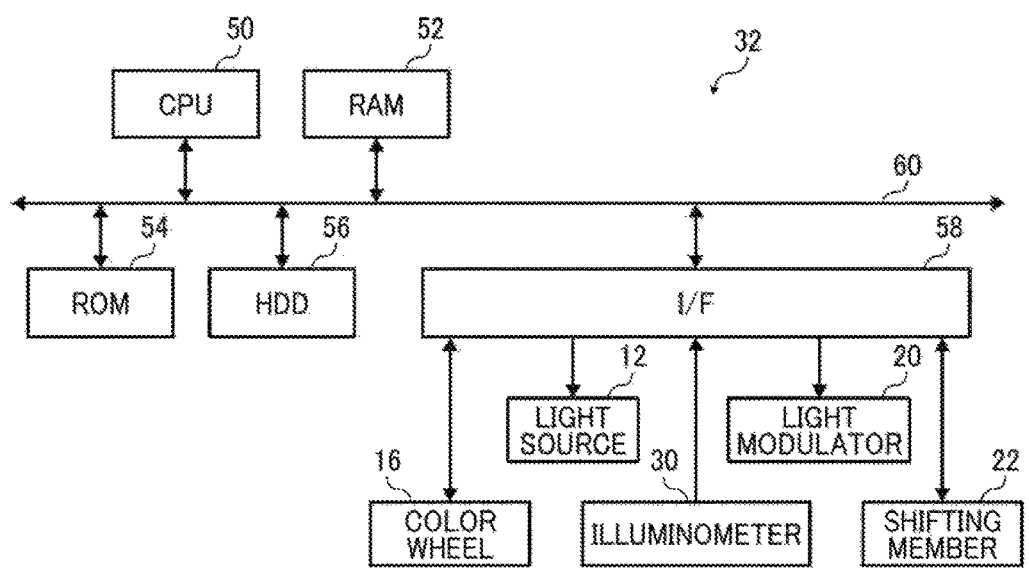
FIG. 10 is a schematic block diagram illustrating a hardware configuration of a controller of a projector, according to an embodiment of the present disclosure.

FIG. 10 is a schematic block diagram illustrating a hardware configuration of the controller 32 of the projector 10, according to the present embodiment.

As illustrated in FIG. 10, the controller 32 according to the present embodiment is a computer provided with a central processing unit (CPU) 50, a random access memory (RAM) 52, a read-only memory (ROM) 54, a hard disk drive (HDD) 56, an interface (I/F) 58, and a bus 60. The CPU 50, the RAM 52, the ROM 54, the HDD 56, and the interface 58 are connected with each other via the bus 60. For example, the light source 12, the color wheel 16, the light modulator 20, and the shifting member 22 are connected to the interface 58.

The CPU 50 is a computation unit such as a processor. The CPU 50 is responsible for all aspects of the control over the projector 10. The RAM 52 is a volatile memory capable of reading and writing data at high speed, and is used as a work area when the CPU 50 processes data. The ROM 54 is a read-only nonvolatile memory in which firmware programs or the like are stored. The HDD 56 is a data readable/writable nonvolatile memory in which, for example, an operating system (OS), various kinds of control programs, application programs are stored. The interface 58 connects, for example, various kinds of hardware, or networks to the bus 60, and controls these elements.

An image projection program that is executed by the controller 32 according to the present embodiment has a module structure including the timing controller 34, the color-wheel controller 36, and the pixel-shifting controller 38 as described above. In the actual hardware configuration, the CPU 50 reads the image projection program from the ROM 54 and executes the read image projection program. Accordingly, the elements of the module structure mentioned as above are loaded into a main memory. Due to this configuration, the timing controller 34, the color-wheel controller 36, and the pixel-shifting controller 38 are created in the main memory, and the corresponding functions are implemented by a computer.

For example, an image projection program that is executed by the controller 32 according to the present embodiment is integrated, for example, into the ROM 54 in advance for distribution. The image projection program that is executed by the controller 32 according to the present embodiment may be installed for distribution in any desired computer-readable recording medium such as a compact disc, a read-only memory (CD-ROM), a flexible disk (FD), a compact disc-recordable (CD-R), and a digital versatile disk (DVD) in a file format installable or executable by a computer.

Further, the image projection program that is executed by the controller 32 according to the present embodiment may be stored in a computer that is connected to a network such as the Internet so as to be downloaded for provision through the network. Alternatively, the image projection program that is executed by the controller 32 according to the present embodiment may be provided or distributed through a network such as the Internet.

Figure 11:
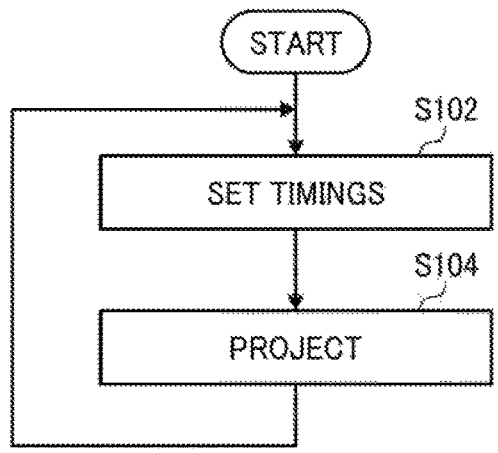
FIG. 11 is a flowchart of the image projection processes performed by the projector according to the first embodiment.

FIG. 11 is a flowchart of the image projection processes performed by the projector 10 according to the first embodiment. The CPU 50 reads a program for image projection processes stored, for example, in the ROM 54 to perform the image projection processes. The image projection processes are an example of an image projection method.

In the image projection processes illustrated in FIG. 11, firstly, the timing controller 34 generates the first timing signal TS1 and the second timing signal TS2, which make up the timings as illustrated in FIG. 9, based on the first status information SD1 obtained from the color-wheel controller 36 and the second status information SD2 obtained from the pixel-shifting controller 38, to set timings (S102).

More specifically, the timing controller 34 generates the first timing signal TS1 and the second timing signal TS2 such that color areas with low visibility (for example, the blue areas 16B) are irradiated with the lights emitted from the light source 12 and a color with low viewability (for example, the blue B) is assigned to the first time periods T1 where the shifting speed is fast. Moreover, the timing controller 34 generates the first timing signal TS1 and the second timing signal TS2 such that color areas with high visibility (for example, the green areas 16G) are irradiated with the lights emitted from the light source 12 and a color with high viewability (for example, the green G) is assigned to the second time periods T2 where the shifting speed is slow.

The timing controller 34 projects an image (S104). More specifically, the timing controller 34 sends the first timing signal TS1 to the color-wheel controller 36, and sends the second timing signal TS2 to the pixel-shifting controller 38. Due to this configuration, the color-wheel controller 36 controls the color wheel 16 based on the first timing signal TS1. The pixel-shifting controller 38 controls the shifting member 22 based on the second timing signal TS2. Under these conditions, the timing controller 34 instructs the light source 12 to emit light and controls the light modulator 20. Accordingly, an image can be projected while performing pixel shifting on the pixels PX.

As described above, the protector 10 controls the color wheel 16 and the shifting member 22 in accordance wish the viewability of human eyes. Due to this configuration, the projector 10 can reduce the smears by synchronizing a color with high viewability (for example, the green G) with the second time periods T2 where the shifting speed is slow, and can increase the smears by synchronizing a color with low viewability (for example, the blue B) with the first time periods T1 where the shifting speed is fast. As a result, the projector 10 can improve the definition of the image and improve the image quality.

Second Embodiment

A second embodiment of the present disclosure is described below that is different from the first embodiment in a feature that the timing controller 34 uses a timing setting selected from a plurality of timing settings for image projection processes.

The timing controller 34 according to the second embodiment obtains the illuminance value IV from the illuminometer 30. The timing controller 34 compares the illuminance value (IV) with a prescribed threshold to determine the variations of light and shade of the surroundings, and generates the first timing signal TS1 and the second timing signal TS2 based on the determination result of the variations of light and shade. The prescribed threshold is, for example, a value ranging from 500 lux to 1000 lux that is close to ordinary in-room brightness, preferably, 1000 lux. The timing controller 34 may compare the multiple illuminance values IV obtained from the multiple illuminometers 30 with a threshold to determine the variations of light and shade. Due to this configuration, the timing controller 34 can more precisely determine the variations of light and shade.

The timing controller 34 selects a timing setting to be used for control from a plurality of timing settings for controlling the timings of the color areas of the color wheel 16 and the pixel shifting by the shifting member 22 based on the determination result of the variations of light and shade. In the second embodiment, the timing controller 34 selects one of the first timing setting and the second timing setting based on a determination result of the variations of light and shade, and uses the selected timing setting for control. The timing controller 34 generates the first timing signal TS1 and the second timing signal TS2 based on the selected timing setting.

When the illuminance values IV become equal to or greater than a threshold and the determination result of the variations of light and shade indicates a bright condition, the tinting controller 34 generates the first timing signal TS1 and the second timing signal TS2 based on the first timing setting illustrated in FIG. 9. In other words, the timing controller 34 generates the first timing signal TS1 and the second timing signal TS2 such that a color with high viewability by human when the peripheral area is bright (for example, the green G) will be assigned to the second time periods T2 where the shifting speed is slow. The timing controller 34 generates the first timing signal TS1 and the second timing signal TS2 such that a color with low viewability by human when the peripheral area is bright (for example, the blue B) will be assigned to the first time periods T1 where the shifting speed is fast. In this configuration, the timing controller 34 may generate the first timing signal TS1 and the second timing signal TS2 such that the color closest to blue (i.e., the blue B in the present embodiment), among a plurality of colors divided by time, will be assigned to the first time periods T1 where the shifting speed is fast, on a priority basis.

Figure 12:
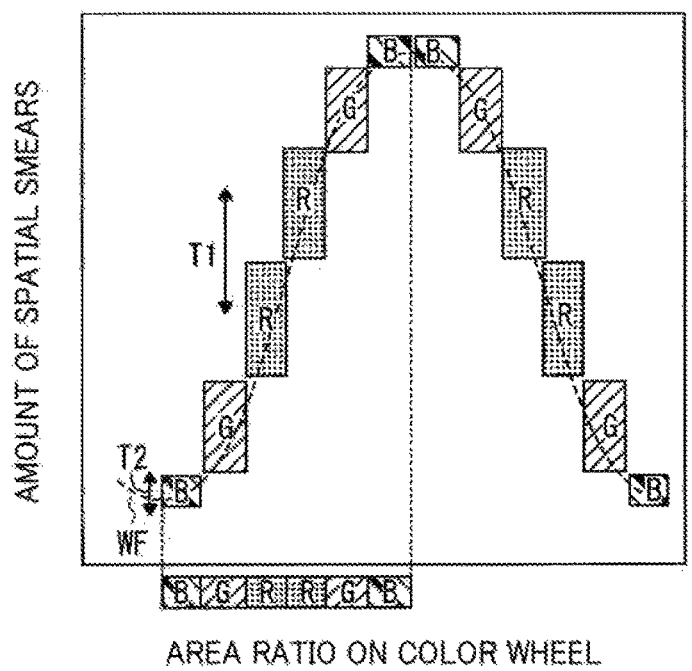
FIG. 12 is a diagram illustrating the relation between the area ratio of the colors of a color wheel and the amount of spatial smears, in the second timing setting according to a second embodiment of the present disclosure.

FIG. 12 is a diagram illustrating the relation between the area ratio of the colors of the color wheel 16 and the amount of spatial smears, in the second timing setting according to the second embodiment of the present disclosure.

When the determination result of the variations of light and shade indicates a dark condition, the timing controller 34 generates the first timing signal TS1 and the second timing signal TS2 based on the second timing setting as illustrated in FIG. 12. In other words, the timing controller 34 generates the first timing signal TS1 and the second timing signal TS2 such that a color with high viewability by human when the peripheral area is dark (for example, the blue B that has the highest visibility when the peripheral area is dark) will be assigned to the second time periods T2 where the shifting speed is slow. Moreover, the timing controller 34 generates the first timing signal TS1 and the second timing signal TS2 such that a color with low viewability by human when the peripheral area is dark (for example, the red R that has the lowest visibility when peripheral area is dark) will be assigned to the first time periods T1 where the shifting speed is fast. In this configuration, the timing controller 34 generates the first timing signal TS1 and the second timing signal TS2 such that the color closest to red (i.e., the red R in the present embodiment), among a plurality of colors divided by time, will be assigned to the first time periods T1 where the shifting speed is fast, on a priority basis.

Figure 13:
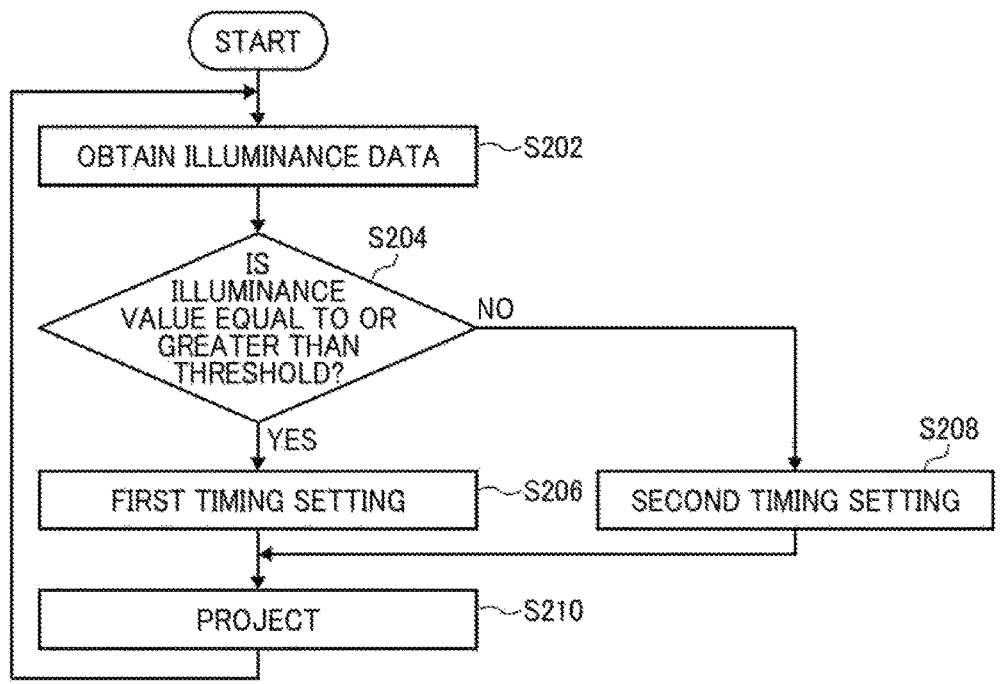
FIG. 13 is a flowchart of the image projection processes performed by a projector according to a second embodiment of the present disclosure.

FIG. 13 is a flowchart of the image protection processes performed by the projector 10 according to the second embodiment. As illustrated in FIG. 13, in the image projection processes, the timing controller 34 obtains the illuminance value IV from the illuminometer 30 (S202). The timing controller 34 determines whether or not the illuminance value IV is equal to or greater than a threshold (S204).

When the area around the projector 10 is bright, the timing controller 34 determines that the illuminance value IV is equal to or greater than a threshold ("YES" in S204), and selects the first timing setting as illustrated in FIG. 9 (see S206). Due to this configuration, the timing controller 34 generates the first timing signal TS1 and the second timing signal TS2, which will make up the first timing setting illustrated in FIG. 9, based on the first status information SD1 obtained from the color-wheel controller 36, the second status information SD2 obtained from the pixel-shifting controller 38, and the first timing setting.

When the area around the projector 10 is dark, the timing controller 34 determines that the illuminance value IV is less than a threshold ("NO" in S204), and selects the second timing setting as illustrated in FIG. 12 (see S208). Due to this configuration, the timing controller 34 generates the first timing signal TS1 and the second timing signal TS2, which make up the second timing setting as illustrated in FIG. 12, based on the first status information SD1 obtained from the color-wheel controller 36, the second status information SD2 obtained from the pixel-shifting controller 38, and the second timing setting.

The timing controller 34 projects an image (S210). More specifically, the timing controller 34 sends the first timing signal TS1 to the color-wheel controller 36, and sends the second timing signal TS2 to the pixel-shifting controller 38. Due to this configuration, the color-wheel controller 36 controls the color wheel 16 based on the first timing signal TS1. The pixel-shifting controller 38 controls the shifting member 22 based on the second timing signal TS2. Under these conditions, the timing controller 34 instructs the light source 12 to emit light and controls the light modulator 20. By so doing, an image is projected.

As described above, the projector 10 according to the second embodiment controls the color wheel 16 and the shifting member 22 in accordance with the visibility of human eye that changes due to the variations of light and shade of the peripheral area. Due to this configuration, the projector 10 can control the influence of smears in color due to pixel shifting, according to the changes in visibility due to the variations of light and shade. As a result, the projector 10 can improve the definition of the image and improve the image quality according to the variations of light and shade of the peripheral area.

Third Embodiment

A third embodiment of the present disclosure is described below that is different from the embodiments described above in timing setting by the timing controller 34.

Figure 14:
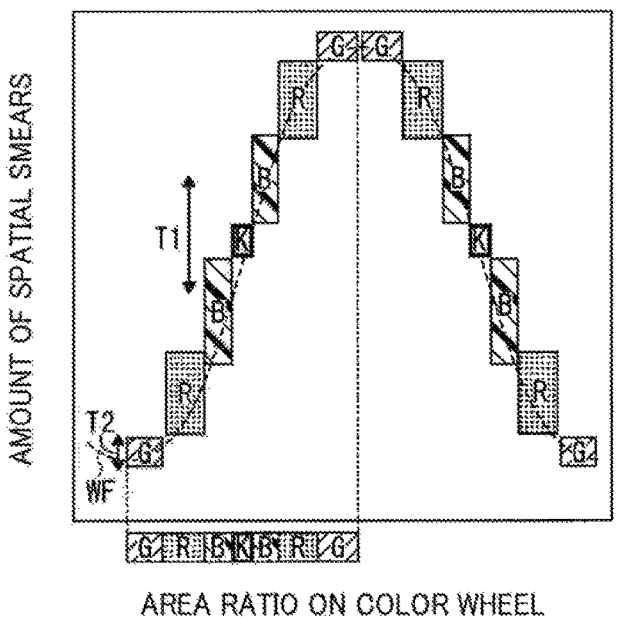
FIG. 14 is a diagram illustrating the timing settings according to a third embodiment of the present disclosure.

FIG. 14 is a diagram illustrating the timing settings according to a third embodiment of the present invention.

As illustrated in FIG. 14, the timing controller 34 according to the third embodiment generates the first timing signal TS1 and the second timing signal TS2 such that a color with lower viewability by human (for example, a color K close to black) than the other colors (for example, the blue B or the red R that is an example of the primary colors with low visibility) is assigned to at least some of the first time periods T1 where the shifting speed of the pixels PX is fast. Note that such at least some of the first time periods T1 includes the time period where the shifting speed is the fastest. The color K that is close to black is, for example, the color closest to black among all the used colors. The color K may be black, or for example, highly concentrated colors such as brown and navy blue. The color K that is close to black is an example of the tertiary colors.

For example, the timing controller 34 turns off the light source 12 during at least some of the fast time periods T1 where the shifting speed is fast, black is assigned to at least some of the first time periods T1 as the color K that is close to black. Due to this configuration, the projector 10 can enhance the black and white contrast to further improve the image quality.

Figure 15:
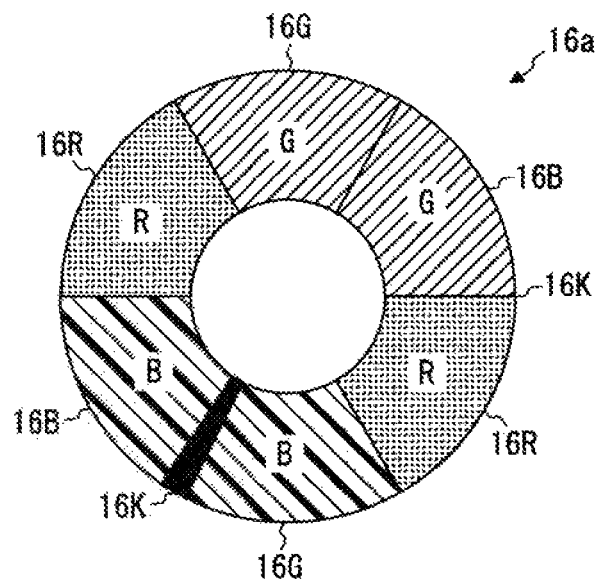
FIG. 15 is a front view of a color wheel according to a third embodiment of the present disclosure.

FIG. 15 is a front view of a color wheel 16a according to the third embodiment of the present disclosure.

As illustrated in FIG. 15, the color wheel 16a may include a black area 16K that transmits a color K that is close to black, in addition to the red areas 16R, the blue areas 16B, and the green areas 16G. The black area K is a color area with high concentration or an area with low optical transmittance compared with the other areas 16R, 16B, and 16G. In this configuration, compared with the other colors including the red R, the green G, and the blue B each of which is an example of the primary colors and the secondary colors, the color K is close to black. The color wheel 16 divides the light by time into light rays of the red R, the green G, the blue B, and the color K that is close to black. In this configuration, the timing controller 34 generates the first timing signal TS1 and the second timing signal TS2 such that the color K close to black will be assigned to at least some of the first time periods T1 where the shifting speed is fast.

As the color K that is close to black is assigned to the first time periods T1 where the shifting speed is fast, the projector 10 according to the third embodiment can completely block the spatial flows of an image being projected, at least, on a temporary basis. Accordingly, the variations due to smears can further be reduced.

Fourth Embodiment

A fourth embodiment of the present disclosure is described below that is different from the embodiments described above in the color wheel and the timing setting.

Figure 16:
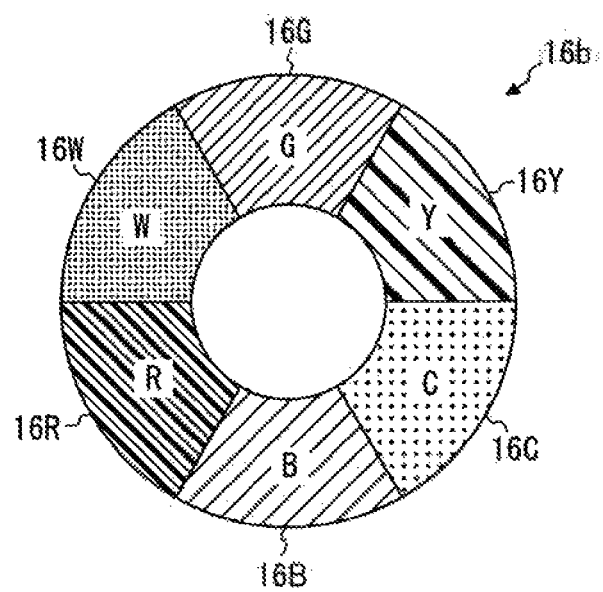
FIG. 16 is a front view of a color wheel according to a fourth embodiment of the present disclosure.

FIG. 16 is a front view of a color wheel 16*b* according to the fourth embodiment of the present disclosure.

As illustrated in FIG. 16, the color wheel 16*b* according to the fourth embodiment has areas divided into six in the circumferential direction, including the red area 16R, the blue area 16B, a cyan area 16C, a yellow area 16Y, the green area 16G, and a white area 16W. The red area 16R, the blue area 16B, the cyan area 16C, the yellow area 16Y, and the green area 16B transmit the red light, blue light, cyan light, yellow light, and the green light, respectively, out of the lights emitted from the light source 12. The white area 16W transmits all the lights emitted from the light source 12.

Figure 17:
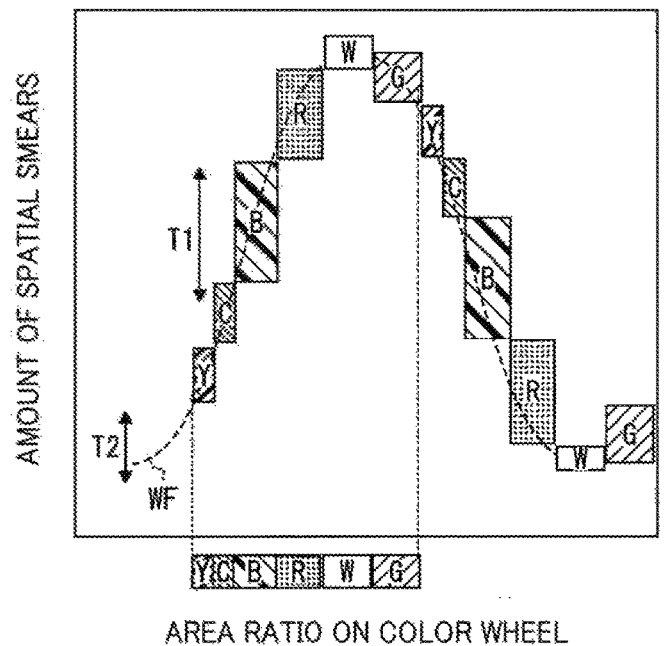
FIG. 17 is a diagram illustrating the relation between the area ratio of the colors of a color wheel and the amount of spatial smears, according to a fourth embodiment of the present disclosure.

FIG. 17 is a diagram illustrating the relation between the area ratio of the colors of the color wheel 16*b* and the amount of spatial smears, according to the fourth embodiment of the present disclosure. As illustrated in FIG. 1, during the first time periods T1 where the shifting speed of the pixel shifting of the pixels PX is fast, the timing controller 34 controls the color wheel 16*b* such that color areas where the human-eye viewability is low (for example, the blue areas 16B) among a color area 16R, color area 16B, color area C, color area Y, color area G, and a color area W of the color wheel 16*b* are irradiated with the lights emitted from the light source 12. Due to this configuration, the timing controller 34 assigns a color with low viewability (for example, the blue B) to the first time periods T1 where the shifting speed is fast and the amount of smears is large. Moreover, during the second time periods T2 where the shifting speed of the pixel shifting of the pixels PX is slow, the timing controller 34 controls the color wheel 16*b* such that a color area where the human-eye viewability is high (for example, the white area 16W) among the color areas 16R, 16B, 16C, 16Y, 16G, and 16W of the color wheel 16*b* are irradiated with the lights emitted from the light source 12. Due to this configuration, the timing controller 34 a color with high viewability (for example, the white W) is assigned to the second time periods T2 where the shifting speed is slow and the amount of smears is small. Accordingly, the timing controller 34 can also control the color wheel 16*b* of RBCYGW, and the influence of the variations in the amount of smears of each color due to the shifting speed of pixel shifting can be reduced and the image quality can be improved.

Figure 18:
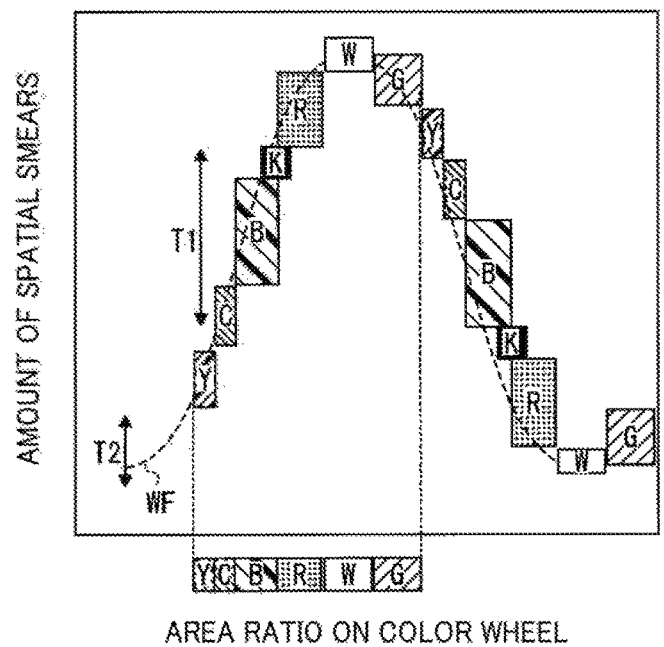
FIG. 18 is a diagram illustrating an alternative example of the relation between the area ratio of the colors of a color wheel and the amount of spatial smears, according to a fourth embodiment of die present disclosure.

FIG. 18 is a diagram illustrating the relation between the area ratio of the colors of the color wheel 16*b* and the amount of spatial smears, according to an alternative example of the fourth embodiment of the present disclosure. As illustrated in FIG. 18, in the fourth embodiment, the timing controller 34 may assign the color K that is closest to black to at least some of the first time periods T1 where the shifting speed of the shifting member 22 is fast (for example, the time periods that include a time period where the shifting speed is the fastest).

For example, the timing controller 34 may turn off the light source 12 during at least some of the first time periods T1 where the shifting speed is fast, and assign the color K that is close to black to at least some of the first time periods T1.

The color wheel 16*b* may involve the black area 16K (see FIG. 15) that divides by time the light into the color K that is close to black. In such a configuration, the black area K may be a color area with high concentration or an area with low optical transmittance compared with the other areas 16R, 16B, 16C, 16Y, 16G, and 16W. In this configuration, the timing controller 34 generates the first timing signal TS1 and the second timing signal TS2 such that the color K close to black will be assigned to at least some of the first time periods T1 where the shifting speed is fast.

The projector 10 according to the fourth embodiment can completely block the spatial flows of an image being projected, at least, on a temporary basis by assigning the color K close to black to at least some of the first time periods T1 where the shifting speed is fast. Accordingly, the variations due to smears can further be reduced.

Fifth Embodiment

A fifth embodiment is described that is different from the embodiments as described above in the type of pixel shifting.

Figure 19:
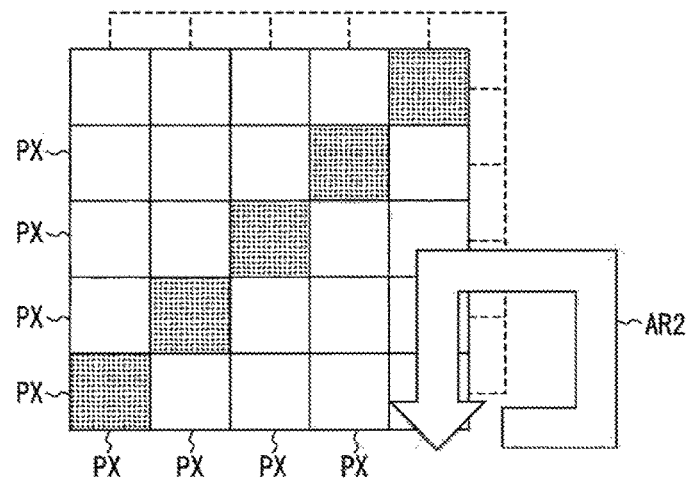
FIG. 19 is a diagram illustrating the arrangement of pixels in four-way pixel shifting, according to an embodiment of the present disclosure.

FIG. 19 is a diagram illustrating the arrangement of pixels in four-way pixel shifting, according to the fifth embodiment of the present disclosure.

The example illustrated in FIG. 19 indicates four-way pixel shifting where the pixels PX are shifted in two directions. An example of the two directions of shifting is the directions parallel to the two directions in which the pixels PX are arranged. As indicated by an arrow AR2, the four-way pixel shifting shifts the pixels PX in line with a square. The four-way pixel shifting can improve the ultra-high definition (UHD) to, for example, 8K.

Figure 20:
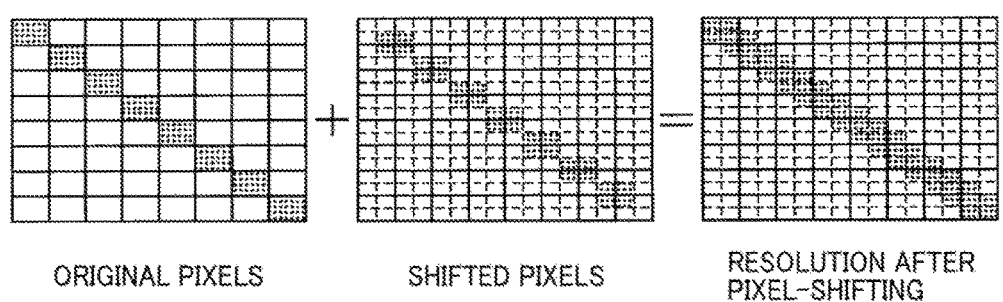
FIG. 20 is a diagram illustrating four-way pixel shifting, according to an embodiment of the present disclosure.

FIG. 20 is a diagram illustrating four-way pixel shifting, according to the present embodiment (see https://www.3.jvckenwood.com/projector/dla-x75r/feature01.html).

In the pixel shifting illustrated in FIG. 20, the pixels PX in the original positions, as illustrated on the left are shifted by half the pixel in the horizontal direction and the vertical direction, as illustrated in the center. Due to this configuration, as illustrated on the right of FIG. 20 where the drawing on the left and the drawing in the center are superimposed on top of one another, the four-way pixel shifting offers a four-fold improvement in resolution.

In the four-way pixel shifting according to the fifth embodiment, the timing controller 34 generates the first timing signal TS1 and the second timing signal TS2 based on the timing setting according to the embodiments described above.

For example, when pixel shifting is to be performed in one of the two directions of pixel shifting, the timing controller 34 may adopt the first timing setting as illustrated above in FIG. 9. In a similar manner, when pixel shifting is to be performed in the other one of the two directions of pixel shifting, the timing controller 34 may adopt the first timing setting as illustrated above in FIG. 9.

Alternatively, the timing controller 34 may apply any one of the first timing setting as illustrated in FIG. 9 and the second timing setting as illustrated in FIG. 12 to each one of the two directions of pixel shifting, based on the illuminance value IV.

Sixth Embodiment

Figure 21:
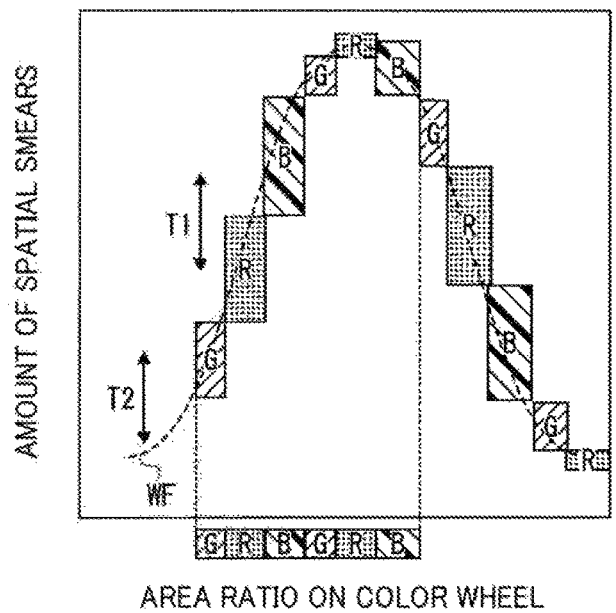
FIG. 21 is a diagram illustrating the relation between the area ratio of the colors of a color wheel and the amount of spatial smears, in the first timing setting according to a sixth embodiment of the present disclosure.

FIG. 21 is a diagram illustrating the relation between the area ratio of the colors of a color wheel and the amount of spatial smears, in the first timing setting according to a sixth embodiment of the present disclosure.

Figure 22:
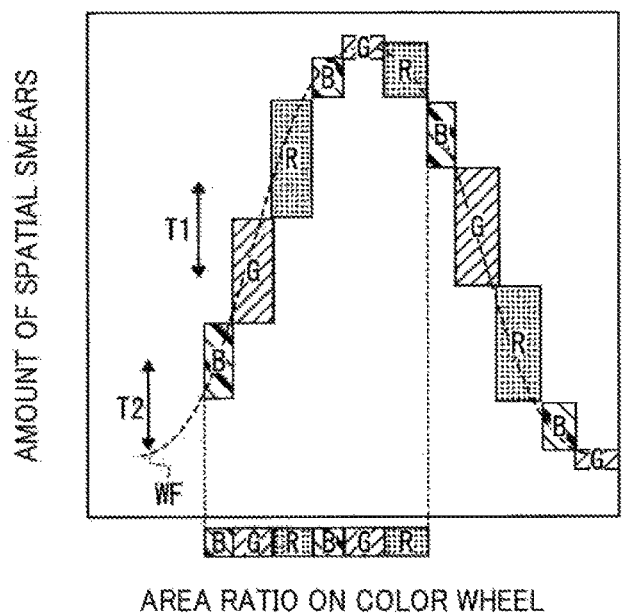
FIG. 22 is a diagram illustrating the relation between the area ratio of the colors of a color wheel and the amount of spatial smears, in the second timing setting according to the sixth embodiment of the present disclosure.

FIG. 22 is a diagram illustrating the relation between the area ratio of the colors of a color wheel and the amount of spatial smears, in the second timing setting according to the sixth embodiment of the present disclosure.

As illustrated in FIG. 21, under bright environments, the timing controller 34 may control the color wheel 16 such that color areas where the human-eye viewability is low under bright environments (for example, the blue areas 16B and the red areas 16R) among the color areas 16R, 16G, and 16B of the color wheel 16 are irradiated with the lights emitted from the light source 12 during the first time periods T1 where the shifting speed of the pixel shifting of the pixels PX is fast, and may assign a color where the human-eye viewability is low (for example, the blue B and the red R) to the first time periods T1.

As illustrated in FIG. 22, under dark environments, the timing controller 34 may control the color wheel 16 such that color areas where the human-eye viewability is low under dark environments (for example, the green areas 16G and the red areas 16R) among the color areas 16R, 16G, and 16B of the color wheel 16 are irradiated with the lights emitted from the light source 12 during the first time periods T1 where the shifting speed of the pixel shifting of the pixels PX is fast, and may assign a color where the human-eye viewability is low (for example, the green G and the red R) to the first time periods T1.

For example, the functions, connections, the number of elements, and the arrangement of the configurations according to the embodiments as described above may be changed where appropriate. The configurations according to the embodiments as described above may be combined as appropriate. Further, the order of the steps in the flowcharts as described above may be changed where appropriate.

In the embodiments as described above, cases in which the light modulator 20 is a DMD are described. However, the light modulator 20 may be a device with liquid crystal on silicon (LCoS) using a liquid crystal panel.

In the embodiments as described above, cases in which the shifting speed of pixel shifting is in a sine wave are described. However, no limitation is intended thereby and the shifting speed may be in a different form. The shifting speed is satisfactory as long as variable speed is adopted, and for example, the shifting speed may be in a form of square wave.

In the embodiments as described above, cases in which the shifting member 22 reflects the lights that form pixels are described. However, no limitation is intended thereby and the shifting member 22 may be in a different configuration. For example, the shifting member may shift the light modulator 20 to shift the pixels. In such a configuration, the shifting member shifts the light modulator 20 such that the light modulator 20 swings at high speed or moves back and forth.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored on any kind of storage medium. Examples of storage media include, but are not limited to, flexible disks, hard disks, optical discs, magneto-optical discs, magnetic tape, nonvolatile memory cards, ROM, etc. Alternatively, any one of the above-described and other methods of the present invention may be implemented by ASICs, prepared by interconnecting an appropriate network of conventional component circuits, or by a combination thereof with one or more conventional general-purpose microprocessors and/or signal processors programmed accordingly.

What is claimed is:

1. A projector comprising:
a color wheel configured to divide light by time into light rays of a plurality of colors including at least a first color and a second color, the light forming an image to be projected;
an image generator configured to generate the image including a plurality of pixels from the light rays divided by time by the color wheel;
a shifting member configured to shift the plurality of pixels of the image formed by the first color and the second color, with varying shifting speeds;
a color-wheel controller configured to control the color wheel;
a shifting controller configured to control the shifting member; and
a timing controller configured to
generate a first timing signal for controlling timings of the color wheel and a second timing signal for controlling timings of the shifting member to assign the first color to a first time period and assign the second color, which has a higher human visibility than the first color, to a second time period during which shifting speed of the pixels of the shifting member is slower than during the first time period, so that the second color is irradiated with the light during the second time period, and an amount of spatial smears of the first color irradiated with the light is increased compared to the amount of spatial smears of the first color assigned to the second period and irradiated with the light, and an amount of spatial smears of the second color irradiated with the light is reduced compared to the amount of spatial smears of the second color assigned to the first period and irradiated with the light.

2. The projector according to claim 1, wherein the timing controller generates the first timing signal and the second timing signal, to assign a third color with lower human visibility than the first color to at least some of the first time period.

3. The projector according to claim 2, further comprising:
a light source configured to output light to form the image, wherein the third color is black, and
wherein the timing controller turns off the light source during at least some of the first time period.

4. The projector according to claim 2, wherein the color wheel divides the light by time into the light rays including at least the first color, the second color, and the third color closer to black than the second color.

5. The projector according to claim 1, further comprising:
an illuminance measuring instrument configured to measure an illuminance value indicating illuminance of a peripheral area,
wherein the timing controller generates the first timing signal and the second timing signal based on a result of comparison between the illuminance value and a prescribed threshold.

6. The projector according to claim 5, wherein when the illuminance value is equal to or greater than the threshold, the timing controller assigns one of the plurality of colors closest to blue to the first time period.

7. The projector according to claim 5, wherein when the illuminance value is less than the threshold, the timing controller assigns one of the plurality of colors closest to red to the first time period.

8. The projector according to claim 5, wherein the threshold is a value ranging from 500 lux to 1000 lux.

9. The projector according to claim 1, wherein the shifting member shifts the image generator to shift the pixels.

10. The projector according to claim 1, wherein the first color is red and the second color is green.

11. The projector according to claim 1, wherein the first color is blue and the second color is green.

12. A method of projecting an image, the method comprising:
generating a first timing signal and a second timing signal, to assign a first color to a first time period; and
generating the first timing signal and the second timing signal, to assign a second color, which has a higher human visibility than the first color, to a second time period during which shifting speed of pixels of an image to be projected is slower than during the first time period so that the second color is irradiated with the light during the second time period, and an amount of spatial smears of the first color irradiated with the light is increased compared to the amount of spatial smears of the first color assigned to the second period and irradiated with the light, and an amount of spatial smears of the second color irradiated with the light is reduced compared to the amount of spatial smears of the second color assigned to the first period and irradiated with the light.

13. A computer-readable non-transitory recording medium storing a program for causing a computer to execute a method, the method comprising:
generating a first timing signal and a second timing signal, to assign a first color to a first time period; and
generating the first timing signal and the second timing signal, to assign a second color, which has a higher human visibility than the first color, to a second time period during which shifting speed of pixels of an image to be projected is slower than during the first time period so that the second color is irradiated with the light during the second time period, and an amount of spatial smears of the first color irradiated with the light is increased compared to the amount of spatial smears of the first color assigned to the second period and irradiated with the light, and an amount of spatial smears of the second color irradiated with the light is reduced compared to the amount of spatial smears of the second color assigned to the first period and irradiated with the light.

* * * * *